(12) United States Patent
Kawano et al.

(10) Patent No.: US 10,965,106 B2
(45) Date of Patent: Mar. 30, 2021

(54) GAS-INSULATED ELECTRICAL EQUIPMENT

(71) Applicant: Mitsubishi Electric Corporation, Chiyoda-ku (JP)

(72) Inventors: Ryoko Kawano, Chiyoda-ku (JP); Soichiro Kainaga, Chiyoda-ku (JP); Manabu Yoshimura, Chiyoda-ku (JP); Takao Tsurimoto, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 456 days.

(21) Appl. No.: 16/063,742

(22) PCT Filed: Sep. 15, 2016

(86) PCT No.: PCT/JP2016/077301
§ 371 (c)(1),
(2) Date: Jun. 19, 2018

(87) PCT Pub. No.: WO2017/141474
PCT Pub. Date: Aug. 24, 2017

(65) Prior Publication Data
US 2019/0372318 A1    Dec. 5, 2019

(30) Foreign Application Priority Data
Feb. 17, 2016    (JP) .............................. JP2016-027534

(51) Int. Cl.
*H02B 13/045*    (2006.01)
*H02B 13/035*    (2006.01)
*H02G 5/06*    (2006.01)

(52) U.S. Cl.
CPC ......... *H02B 13/045* (2013.01); *H02B 13/035* (2013.01); *H02G 5/065* (2013.01)

(58) Field of Classification Search
CPC ...... H02G 5/063; H02G 5/065; H02B 13/035; H02B 13/045; H01F 27/321
See application file for complete search history.

(56) References Cited

U.S. PATENT DOCUMENTS 4,667,061 A * 5/1987 Ishikawa ................ H02G 5/063
174/14 R
9,508,507 B2 * 11/2016 Yoshimura ............... H01B 3/16
(Continued)

FOREIGN PATENT DOCUMENTS

EP    2 405 550 A1    1/2012
JP    59-149422 U    10/1984
(Continued)

OTHER PUBLICATIONS

International Search Report dated Dec. 20, 2016 in PCT/JP2016/077301 filed Sep. 15, 2016.

*Primary Examiner* — Zachary Pape
(74) *Attorney, Agent, or Firm* — Xsensus LLP

(57) ABSTRACT

A gas-insulated electrical equipment includes: a grounded tank filled with an insulating gas; a central conductor which is disposed inside the grounded tank and to which to apply a voltage; a high-resistance insulating portion which is disposed on an inner surface of the grounded tank and which is configured of an insulating material of high resistivity; a low-resistance insulating portion which is disposed on at least a partial front surface of the high-resistance insulating portion and which has a resistivity lower than that of the high-resistance insulating portion, and a non-linear resistance insulating portion which is disposed on at least a partial front surface of the low-resistance insulating portion and which is configured of a non-linear resistance material, which exhibits a non-linear resistivity relative to a change in electric field, and an insulating material of high resistivity, (Continued)

wherein the low-resistance insulating portion has a floating potential.

5 Claims, 9 Drawing Sheets

(56) References Cited

U.S. PATENT DOCUMENTS

| | | | | |
|---|---|---|---|---|
| 9,972,987 B2* | 5/2018 | Nakauchi | ............... | H02G 5/063 |
| 10,043,621 B2* | 8/2018 | Kainaga | ................. | H02G 5/065 |
| 10,069,285 B2* | 9/2018 | Kainaga | ................. | H02G 5/065 |
| 2015/0357801 A1* | 12/2015 | Nakauchi | ............... | H02G 5/065 |
| | | | | 361/618 |
| 2017/0149226 A1 | 5/2017 | Nakauchi et al. | | |

FOREIGN PATENT DOCUMENTS

| | | | | | |
|---|---|---|---|---|---|
| JP | 02079711 A | * | 3/1990 | ............ | H02G 5/066 |
| JP | 2000166065 A | * | 6/2000 | | |
| JP | 5135263 B2 | | 2/2013 | | |
| JP | 5705384 B1 | | 4/2015 | | |

* cited by examiner

GAS-INSULATED ELECTRICAL EQUIPMENT

TECHNICAL FIELD

The present invention relates to a gas-insulated electrical equipment wherein a central conductor to which to apply a high voltage is housed inside a grounded tank, and the central conductor and the grounded tank are insulated by an insulating gas with which is filled the inside of the grounded tank.

BACKGROUND ART

A gas-insulated switchgear as a gas-insulated electrical equipment secures an insulating performance by housing a central conductor, to which to apply a high voltage, in a metallic grounded tank and sealing an insulating gas in a space between the grounded tank and the central conductor. However, there is a possibility that a foreign substance (dust, a fiber, a conductive or semiconductive solid, or the like) is mixed into the grounded tank when in fabrication or when in on-site installation operation, leading to a decrease in insulating performance. The mixed foreign substance is electrically charged by an electric field generated when electrical current is supplied, and is subject to an electrostatic force in the direction in which the foreign substance floats up from an inner surface of the grounded tank. When the electrostatic force is larger than the force of gravity acting on the foreign substance, the foreign substance floats up and moves toward the central conductor. As the electric field concentrates around the foreign substance, there is a possibility that when the foreign substance comes closer to or attaches to the central conductor, a high electric field is locally generated, resulting in a decrease in the withstand voltage performance of the switchgear. Specifically, when the foreign substance is metallic and linear, the electric field concentrates strongly at a leading end of the foreign substance, causing a critical decrease in insulating performance.

With respect to the problem of the metallic foreign substance, various solutions, such as to relax the electric field concentration occurring in the portion of contact between the metallic foreign substance and a film provided on the inner surface of the tank, to prevent the metallic foreign substance from being electrically charged due to partial discharge occurring in the concentrating electric field, and thus to prevent the metallic foreign substance from floating up, are known as shown in the following.

For example, Patent Literature 1 describes a gas insulated bus which is made of a double-layered film of different materials wherein a coating film of high resistivity is provided on the inner surface of the tank, and a coating film of high mechanical strength is further provided on top of the high-resistivity coating film.

Also, Patent Literature 2 describes a closed insulating device wherein a non-linear resistance film, wherein a non-linear resistance material having non-linear resistance characteristics that a resistance value decreases with an increase in current density is filled with a filler different in permittivity from the non-linear resistance material, is provided on the inner surface of the tank.

Furthermore, Patent Literature 3 describes a gas-insulated equipment wherein an insulating film of low resistivity is provided on the inner surface of the tank, and a non-linear resistance film wherein a non-linear resistance material is contained in an insulating material is provided on top of the insulating film.

CITATION LIST

Patent Literature

PTL 1: JP-UM-A-59-149422
PTL 2: Japanese Patent No. 5,135,263
PTL 3: Japanese Patent No. 5,705,384

SUMMARY OF INVENTION

Technical Problem

However, with the configuration shown in Patent Literature 1 wherein the insulating coating film of high resistivity is provided on the inner surface of the tank, it is effective to suppress a behavior of the metallic foreign substance when a voltage is low, but it is difficult to suppress a behavior of the metallic foreign substance when the voltage is high, resulting in that the metallic foreign substance floats up.

With the configuration shown in Patent Literature 2 wherein the non-linear resistance film is provided on the inner surface of the tank, there is a possibility that when a high voltage is applied, the electric field concentrates in a portion of the metallic foreign substance which is in no contact with the non-linear resistance film and is exposed to the insulating gas, and partial discharge occurs in the portion in which the electric field concentrates, thus electrically charging the metallic foreign substance.

Also, with the configuration shown in Patent Literature 3 wherein the non-linear resistance film is provided on top of the insulating film, in the event that the metallic foreign substance is disposed on a front surface of the non-linear resistance film on which the non-linear resistance filler exists only partially, the metallic foreign substance is in the same state as it is disposed on top of the insulating film, and so there is a possibility that partial discharge occurs in the vicinity of the point of contact, between the film and the metallic foreign substance even at a low voltage, thus electrically charging the metallic foreign substance. For these reasons, the electrostatic force acting on the electrical charge of the metallic foreign substance exceeds the force of gravity acting on the metallic foreign substance, and then the metallic foreign substance starts floating up, causing a critical decrease in the insulating performance of the gas-insulated switchgear.

The invention, having been contrived in order to solve the heretofore mentioned problems, has for its object to provide a gas-insulated electrical equipment which can suppress partial discharge in both a portion in which a metallic foreign substance is in contact with an insulating film and a portion which is exposed to an insulating gas.

Solution to Problem

A gas-insulated electrical equipment according to the invention includes a grounded tank filled with an insulating gas; a central conductor which is disposed inside the grounded tank and to which to apply a voltage; a high-resistance insulating portion which is disposed on a lower, inner surface of the grounded tank and which is configured of an insulating material of high resistivity; a low-resistance insulating portion which is disposed on at least a partial front surface of the high-resistance insulating portion and which has a resistivity lower than that of the high-resistance insulating portion; and a non-linear resistance insulating portion which is disposed on at least a partial front surface of the low-resistance insulating portion and which is configured of a non-linear resistance material, which exhibits a non-linear resistivity relative to a change in electric field, and an insulating material of high resistivity, wherein the low-resistance insulating portion has a floating potential.

Advantageous Effects of Invention

According to the gas-insulated electrical equipment of the invention, there provides the advantageous effect that it is possible to relax the electric field on the surfaces of both a portion in which a metallic foreign substance is in contact with an insulating film and a portion which is exposed to an insulating gas, and thus possible to prevent the metallic foreign substance from being electrically charged.

DESCRIPTION OF EMBODIMENTS

Embodiment 1

Hereafter, a detailed description will be given, based on FIGS. 1 to 10, of a gas-insulated electrical equipment according to Embodiment 1 of the invention.

Figure 1:
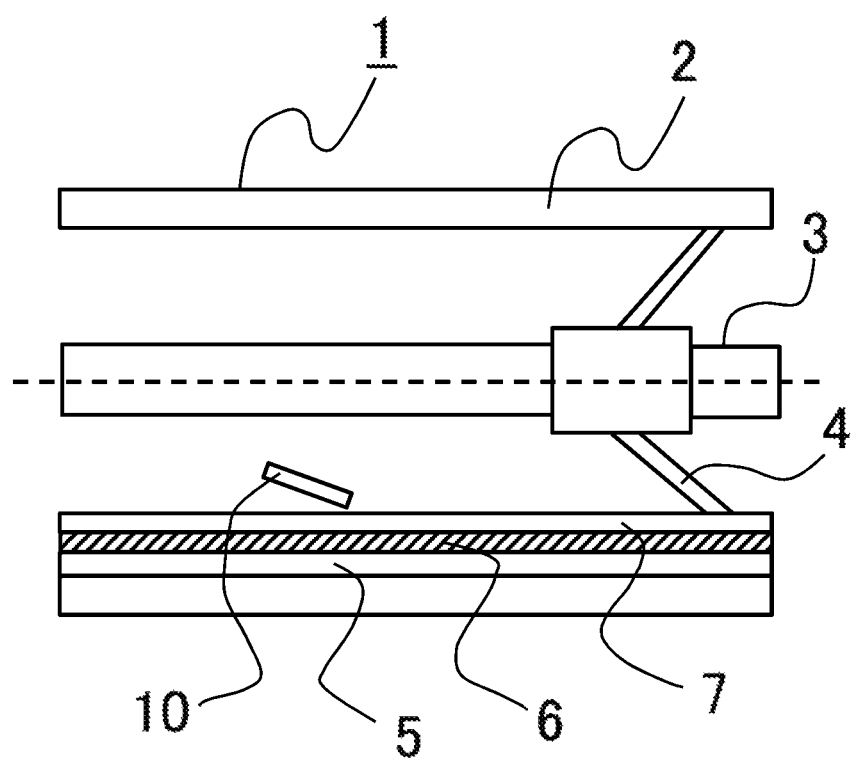
FIG. 1 is an axial sectional view of a gas-insulated electrical equipment according to Embodiment 1 of the invention.
Figure 2:
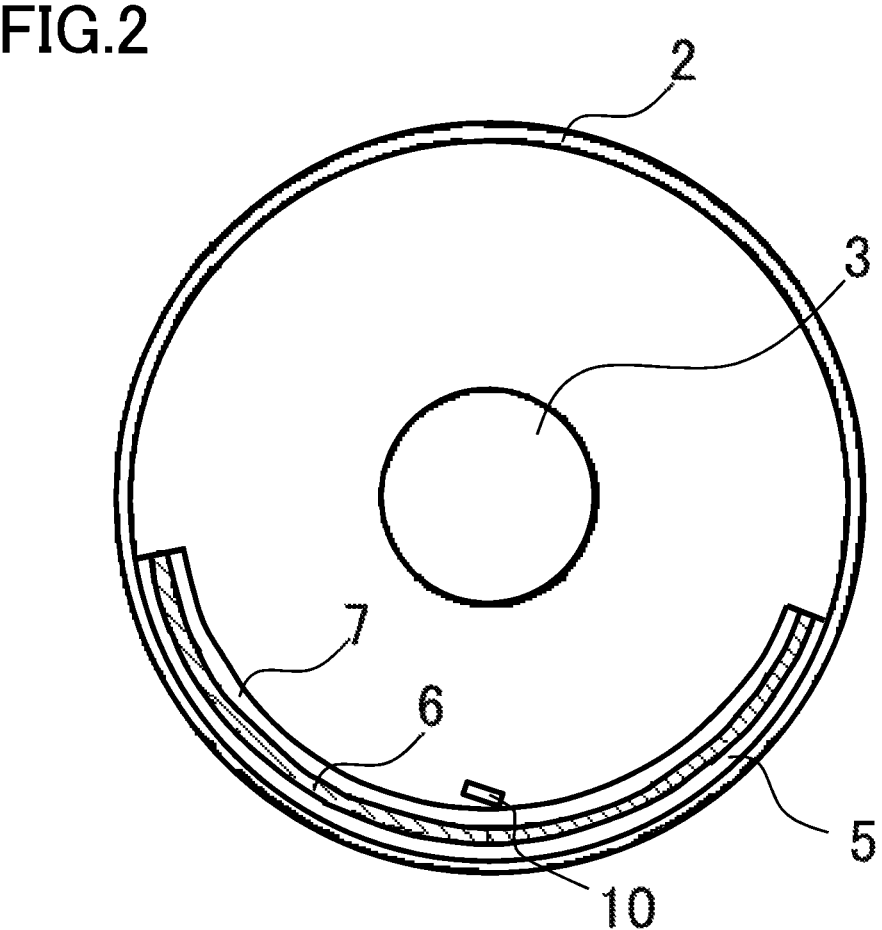
FIG. 2 is a radial sectional view of the gas-insulated electrical equipment according to Embodiment 1 of the invention

FIG. 1 is an axial sectional view of the gas-insulated electrical equipment according to Embodiment 1, and FIG. 2 is a radial sectional view of the gas-insulated electrical equipment. In FIGS. 1 and 2, the gas-insulated electrical equipment 1 has a cylindrical grounded tank 2 which is a pressure vessel, a central conductor 3 which is disposed inside the grounded tank 2 and to which to apply a high voltage, and an insulating support member 4 which is attached to the grounded tank 2 and which insulating supports the central conductor 3. The central conductor 3 is fixed in the position of a center coaxial with the grounded tank 2 by the insulating support member 4 formed of a solid insulator. The gas-insulated electrical equipment 1 shown in FIGS. 1 and 2 configures a gas-insulated switchgear together with a device, such as a breaker, a disconnector, or an instrument current transformer, in addition to the above-described components.

An insulating gas (not shown) for insulating the grounded tank 2 and the central conductor 3 is filled between the two. The insulating gas includes a single-component gas, such as $SF_6$, dry air, $N_2$, $CO_2$, $O_2$, or $CF_3I$. A mixture of two or more kinds of the heretofore mentioned gases may be used as the insulating gas.

A high-resistance insulating film 5 (a high-resistance insulating portion) having a high resistivity is disposed on an inner surface of the grounded tank 2. The high-resistance insulating film 5 is disposed, for example, on a lower, inner surface of the grounded tank 2. The high-resistance insulating film 5 is a coating film formed of a resin-based insulating material. A thermoplastic resin and a thermosetting resin are considered as examples of the insulating material. For example, a vinyl chloride, polyester, or nylon resin is used as the thermoplastic resin, and for example, an epoxy, urethane, or acrylic resin is used as the thermosetting resin. As a method of forming the high-resistance insulating film 5, there is a method of forming a thin film using a spray coating, a brush coating, a baking coating, a dip coating, a sheet coating, or the like, and then hardening the thin film.

Also, a low-resistance insulating film 6 (a low-resistance insulating portion) having a lower electrical resistivity than the electrical resistivity of the high-resistance insulating film 5 is disposed on top of the high-resistance insulating film 5 so as to at least partially coat the high-resistance insulating film 5. The low-resistance insulating film 6 is disposed on the front surface of the high-resistance insulating film 5 disposed on the lower, inner surface of the grounded tank 2, as shown for example in FIG. 2, so as to be in no contact with the grounded tank 2. As a method of forming the low-resistance insulating film 6, there is a method of mixing a low-resistance material of powder particles having a particle size of, for example, several micrometers to tens of micrometers, with a liquid binder resin, forming a thin film using a spray coating, a brush coating, a baking coating, a dip coating, a sheet coating, or the like, and then hardening the thin film.

However, in this case, a material different from the low-resistance material is mixed as a constituent material of the low-resistance insulating film 6, and so it is necessary to make the volume fraction of the low-resistance material higher than that of another mixture. Also, requirements include that a low-resistance material applicable to the gas-insulated electrical equipment is not a metal, does not generate a cracked gas, has little aged deterioration in performance during an operating time, and does not deteriorate in performance under a thermal environment of around 100° C.

Also, a non-linear resistance insulating film 7 (a non-linear resistance insulating portion) is disposed on top of the low-resistance insulating film 6 so as to at least partially coat the low-resistance insulating film 6. The non-linear resistance insulating film 7 is disposed on the front surface of the low-resistance insulating film 6 disposed on top of the high-resistance insulating film 5 disposed on the lower, inner surface of the grounded tank 2, as shown for example in FIG. 2, so as to be in no contact with the grounded tank 2.

Figure 3:
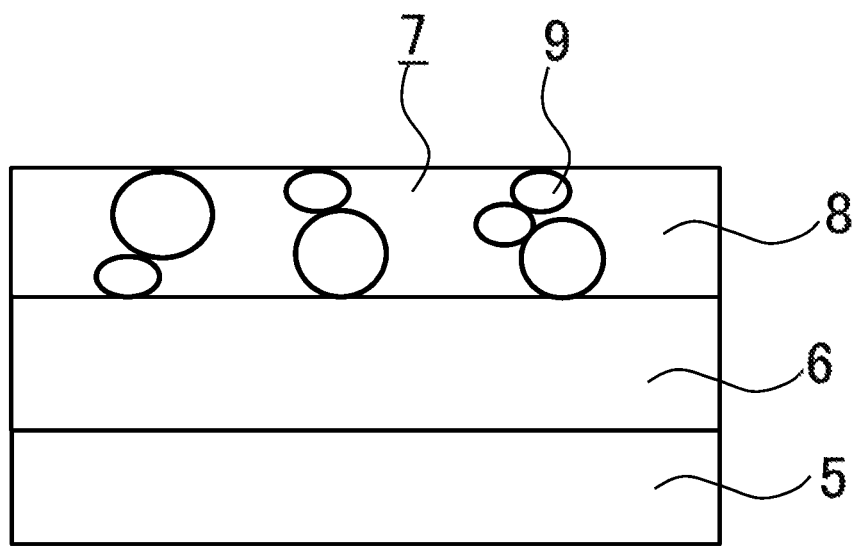
FIG. 3 is a diagram showing a condition in which a non-linear resistance material is distributed in a non-linear resistance film of the gas-insulated electrical equipment according to Embodiment 1 of the invention.
Figure 4:
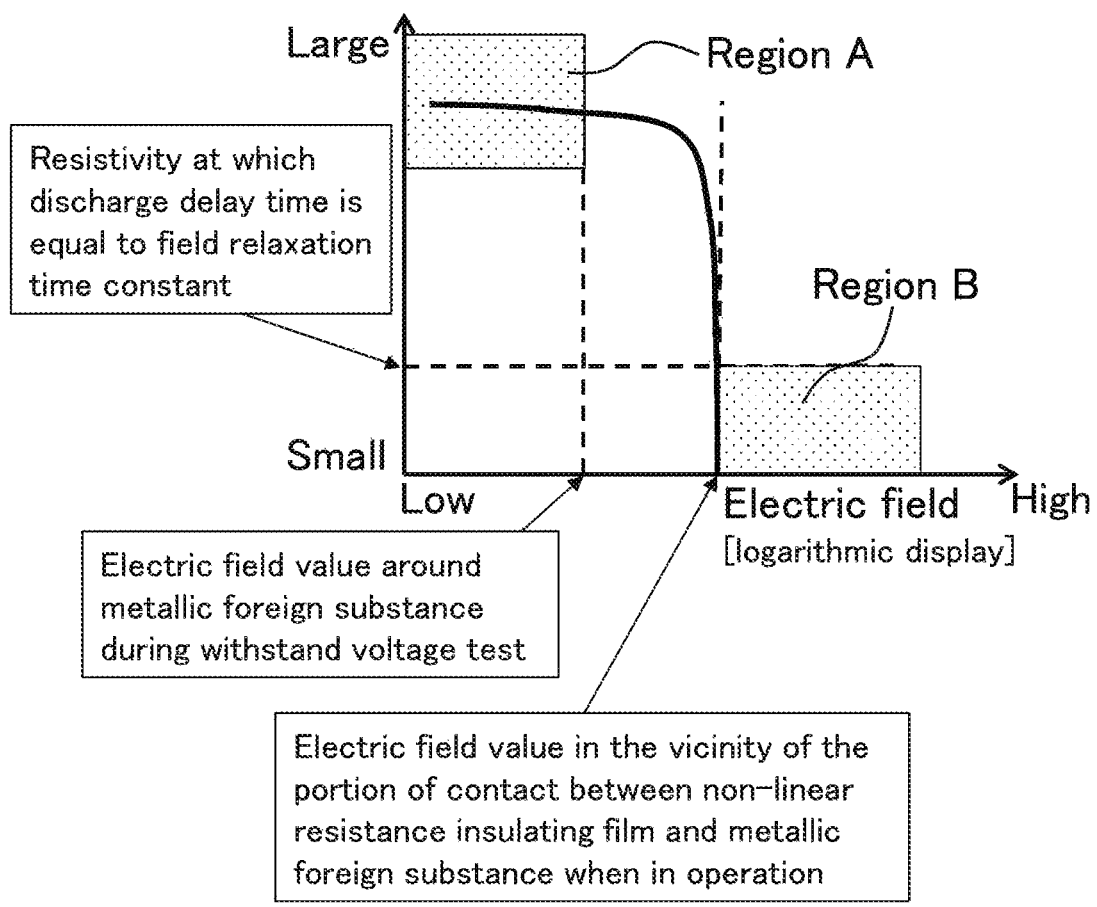
FIG. 4 is a graph showing a change in a resistivity, relative to an electric field, of a non-linear resistance insulating film of the gas-insulated electrical equipment according to Embodiment 1 of the invention.

Also, as shown in FIG. 3, the non-linear resistance insulating film 7 contains a non-linear resistance material 9 (for example, zinc oxide or silicon carbide) in a resin-based insulating material 8 so as to be discretely distributed in the film. The non-linear resistance material 9 has the characteristics that it has a non-linear resistivity relative to an electric field, as shown for example in FIG. 4, and that the resistance value is high in the low electric field region but is low in the high electric field region. In FIG. 4, the region A shows a target resistivity region when the electric field is low, and the region B a target resistivity region when the electric field is high.

The non-linear resistance material 9 exhibiting non-linear resistance characteristics includes, for example, gallium nitride diamond other than zinc oxide or silicon carbide. Also, a thermoplastic resin and a thermosetting resin are considered as examples of the insulating material 8. For example, a vinyl chloride, polyester, or nylon resin is used as the thermoplastic resin, and for example, an epoxy, urethane, or acrylic resin is used as the thermosetting resin. A method of forming the non-linear resistance insulating film 7 includes, for example, a spray coating, a brush coating, a baking coating, a dip coating, and a sheet coating.

Next, a description will be given of a physical phenomenon produced in the gas-insulated electrical equipment 1 according to Embodiment 1 of the invention.

Most parts configuring the gas-insulated electrical equipment 1 are assembled in a clean room in a factory and transported to a site, but some are assembled at the site. For this reason, there is a possibility that a metallic foreign substance 10 is mixed into the gas-insulated electrical equipment 1, as shown in FIGS. 1 and 2, during on-site assembly. Most of these metallic foreign substances 10 are removed in an inspection process, but the metallic foreign substance 10 with a length of on the order of 3 mm or less and a thickness of on the order of 0.2 mm or less is difficult to find, and in some cases, is overlooked in the inspection and left behind in the grounded tank 2.

The metallic foreign substance 10, immediately after coming into being, drops onto the bottom surface of the grounded tank 2 by gravity and comes into the state of lying flat on the bottom surface. Here, when the metallic foreign substance 10 comes into direct contact with a metal configuring the grounded tank 2 in an operating state in which a voltage is being applied to the central conductor 3, a static induction phenomenon acts on the metallic foreign substance 10, and electric charge is supplied to the metallic foreign substance 10 from the grounded tank 2, thus electrically charging the metallic foreign substance 10.

Figure 5:
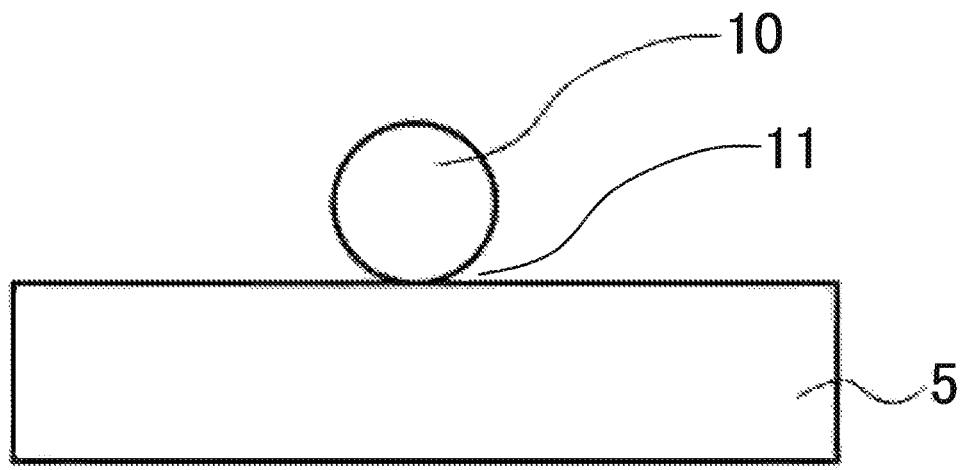
FIG. 5 is an enlarged view describing a minute gap between a metallic foreign substance placed on a common high-resistance insulating film and the high-resistance insulating film.

Meanwhile, when only the high-resistance insulating film 5 is formed on the inner surface of the grounded tank 2, there is no more supply of electric charge to the metallic foreign substance 10 from the grounded tank 2 due to static induction, but as shown in FIG. 5, ions produced by discharge caused by a minute gap 11 in the vicinity of the portion of contact between the metallic foreign substance 10 and the high-resistance insulating film 5 electrically charge the metallic foreign substance 10. As the electric field is generated, between the high-voltage central conductor 3 and the grounded tank 2, in the grounded tank 2 to which the voltage is applied, the electrically charged metallic foreign substance 10, under the action of Coulomb's force responding to the amount of electric charge, stands up from the state of lying flat, and floats up toward the central conductor 3. Subsequently, the metallic foreign substance 10 comes close to and into contact with the central conductor 3. As the electric field is high in the vicinity of the central conductor 3, intrusion of overvoltage, such as a lightening surge, in the state in which the metallic foreign substance 10 is close to the high-voltage central conductor 3, sometimes, leads to an earth fault.

As above, a description has been given of the phenomenon that when the bottom surface of the grounded tank 2 is not coated, or when only the high-resistance insulating film 5 is coated on the bottom surface of the grounded tank 2, the metallic foreign substance 10 stands up from in the state of lying flat in the grounded tank 2 and floats up, but next, a description will be given of an action of the non-linear resistance insulating film 7.

Here, it is assumed that in FIG. 1, the minute metallic foreign substance 10 is mixed into the grounded tank 2 and exists on the non-linear resistance insulating film 7.

When the voltage applied to the central conductor 3 is low, or when the electric field generated from the central conductor 3 is low, the non-linear resistance material 9 in the non-linear resistance insulating film 7 functions as an insulator. Because of this, an inflow of electric charge to the metallic foreign substance 10 from the grounded tank 2 is interrupted, and the metallic foreign substance 10 is hardly electrically charged. Consequently, it does not happen that an electrical attraction force caused by the electric field generated from the central conductor 3 becomes larger than the metallic foreign substance 10's own weight and thus the metallic foreign substance 10 floats up.

On the other hand, when the voltage applied to the central conductor 3 is high, or when the electric field generated from the central conductor 3 is high, the resistance value of the non-linear resistance material 9 in the non-linear resistance insulating film 7 decreases. Because of this, a portion of the non-linear resistance insulating film 7 close to the central conductor 3 exhibits conductivity.

Figure 6:
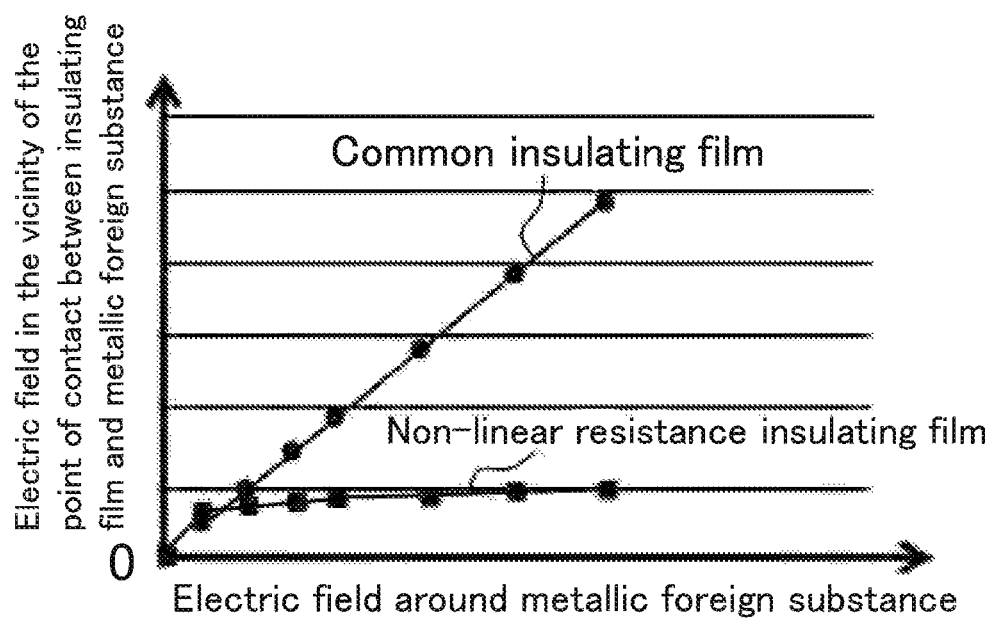
FIG. 6 is a graph showing the dependence of a local electric field in the vicinity of the point of contact between a common insulating film and the metallic foreign substance, upon an electric field around the metallic foreign substance, in the common insulating film and the non-linear resistance insulating film in Embodiment 1.

FIG. 6 is a graph showing the dependence of a local electric field in the vicinity of the point of contact between the metallic foreign substance 10 and the non-linear resistance insulating film 7, upon the electric field around the metallic foreign substance 10, in a common insulating film and the non-linear resistance insulating film 7 in Embodiment 1. As shown in FIG. 6, an electric field concentration in the vicinity of the point of contact between the non-linear resistance insulating film 7 and the metallic foreign substance 10 is relaxed, thus making it difficult for partial discharge to occur, and even in the event that partial discharge occurs, electric charge flows through a portion of the non-linear resistance insulating film 7 facing the central conductor 3 and fades away, thus preventing the metallic foreign substance 10 from being electrically charged.

Meanwhile, a portion of the non-linear resistance insulating film 7 close to the grounded tank 2 keeps a high resistance value, thus preventing the metallic foreign substance 10 from being electrically charged by a movement of electric charge from the inner surface of the grounded tank 2 to the metallic foreign substance 10. For the above reason, it does not happen that the electrical attraction force caused by the electric field generated from the central conductor 3 becomes larger than the metallic foreign substance 10's own weight and thus the metallic foreign substance 10 floats up.

As above, it has been described that by configuring the non-linear resistance insulating film 7, it is possible to relax the electric field in the vicinity of the point of contact between the metallic foreign substance 10 and the grounded tank 2 before partial discharge occurs in the vicinity of the contact therebetween, and thus possible to prevent partial discharge from occurring. Next, on the other hand, a detailed description will be given of deficits of the non-linear resistance insulating film 7.

In order to obtain an electric field relaxation effect in the vicinity of the point of contact between the metallic foreign substance 10 and the non-linear resistance insulating film 1, it is necessary that any one point of the metallic foreign substance 10 is in contact with the non-linear resistance material 9 contained in the non-linear resistance insulating film 7. Also, when the metallic foreign substance 10 is larger than the non-linear resistance material 9, it is desirable that the non-linear resistance material 9 is disposed so as to be distributed as widely as possible in the area of contact between the metallic foreign substance 10 and the non-linear resistance insulating film 7. However, when the proportion of the non-linear resistance material 9 in the non-linear resistance insulating film 7 is made too large, the viscosity of paint decreases when painting, thus bringing out the necessity to change a painting method, or the like, causing the possibility of a decrease in working efficiency.

Figure 7A:
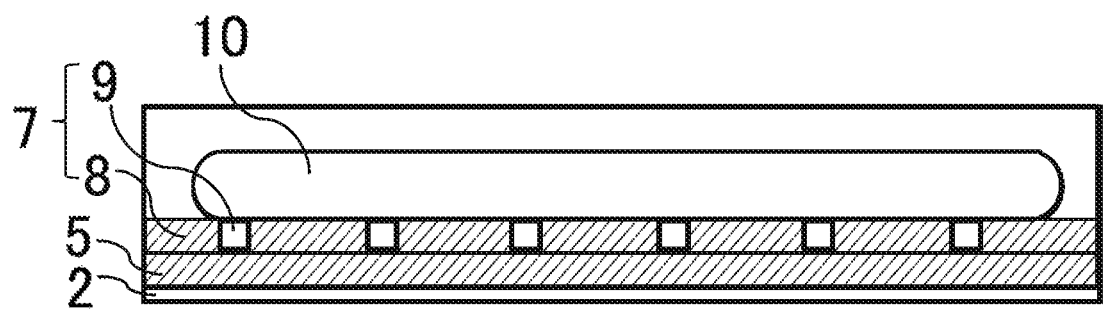
FIG. 7A is a sectional view showing a case in which the metallic foreign substance is disposed on the common insulating film and the non-linear resistance insulating film.
Figure 7B:
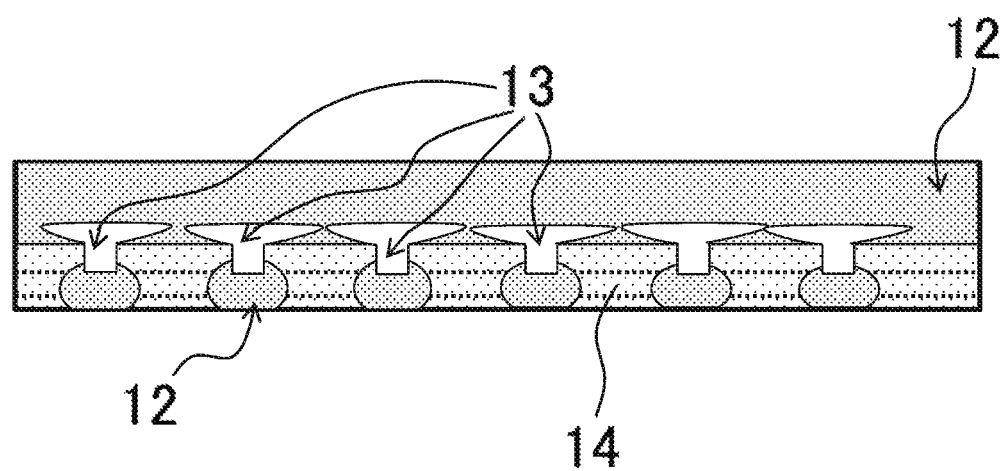
FIG. 7B is a conceptual diagram showing a distribution of a surrounding electric field when the metallic foreign substance disposed on top of the common insulating film and the non-linear resistance insulating film obtains an electric field relaxation brought about by the non-linear resistance insulating film.

Here, FIG. 7A is a sectional view showing a case in which the metallic foreign substance is disposed on the common insulating film and the non-linear resistance insulating film. Also, FIG. 7B is a conceptual diagram showing a distribution of a surrounding electric field when the metallic foreign substance disposed on the common insulating film and the non-linear resistance insulating film obtains an electric field relaxation brought about by the non-linear resistance insulating film. In FIG. 7B, numerals 12 indicate electric field: strong regions, and numerals 13 electric field: weak regions. Also, numeral 14 indicates an electric field: intermediate region showing an electric field intermediate between the electric field: strong regions 12 and the electric field: weak regions 13. As shown in FIG. 7B, a portion of the metallic foreign substance 10 having obtained the electric field relaxation effect brought about by the non-linear resistance insulating film 7, which is in no contact with the non-linear resistance material 9, becomes high in electric field, and so partial discharge occurs in the portion, and it is highly likely that the metallic foreign substance 10 is electrically charged and floats up. In FIG. 7B, only the local electric field around the portion of contact between the metallic foreign substance 10 and the non-linear resistance material 9 is relaxed and weakened. FIG. 7B is shown including an electric field generated on the surface of the metallic foreign substance.

As above, the deficits of the non-linear resistance insulating film 7 have been described, but a detailed description will be given of the gas-insulated electrical equipment 1 according to Embodiment 1 of the invention which makes it difficult for the metallic foreign substance 10 to float up.

Figure 8A:
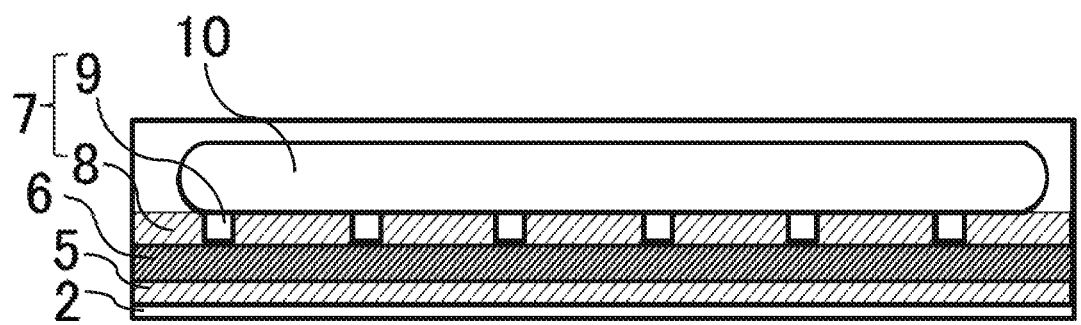
FIG. 8A is a sectional view showing a case in which the metallic foreign substance is disposed on top of the non-linear resistance insulating film, in the gas-insulated electrical equipment according to Embodiment 1 of the invention.
Figure 8B:
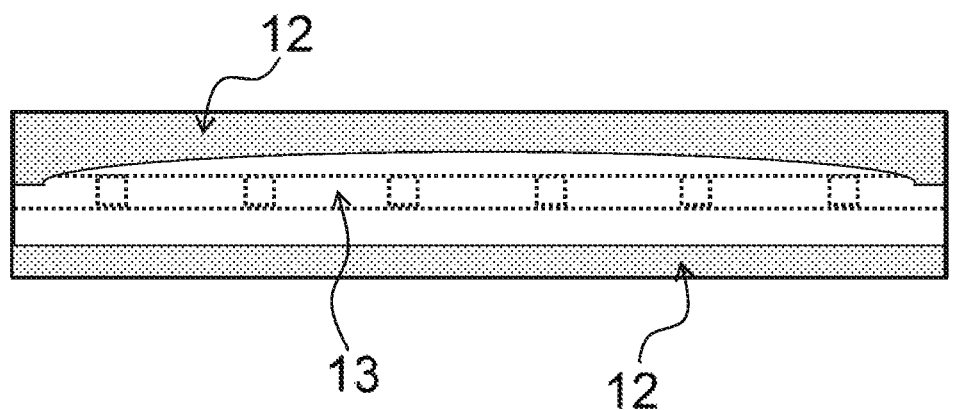
FIG. 8B is a conceptual diagram showing a distribution of a surrounding electric field when the metallic foreign substance obtains the electric field relaxation brought about by the non-linear resistance insulating film, in the gas-insulated electrical equipment according to Embodiment 1 of the invention.

FIG. 8A is a sectional view showing a case in which the metallic foreign substance is disposed on top of the non-linear resistance insulating film, in the gas-insulated electrical equipment according to Embodiment 1 of the invention. FIG. 8B, corresponding to the configuration of FIG. 8A, is a conceptual diagram showing a distribution of a surrounding electric field when the metallic foreign substance obtains the electric field relaxation brought about by the non-linear resistance insulating film, in the gas-insulated electrical equipment according to Embodiment 1 of the invention. FIG. 8B shows a condition of the electric field around the metallic foreign substance 10 in contact with the non-linear resistance insulating film 7 configured on top of the low-resistance insulating film 6 in Embodiment 1. FIG. 8B is shown including an electric field generated on the front surface of the metallic foreign substance 10. In FIG. 8B, numerals 12 show electric field: strong regions, and numeral 13 an electric field: weak region. When the low-resistance insulating film 6 is disposed on the bottom of the non-linear resistance insulating film 7, as in FIG. 8A, it is possible to obtain the effect of reducing the potential of the metallic foreign substance 10 through the non-linear resistance material 9. Because of this, it is possible to relax not only the local electric field around the portion of contact between the metallic foreign substance 10 and the non-linear resistance material 9, but the electric field around the metallic foreign substance 10.

Figure 9:
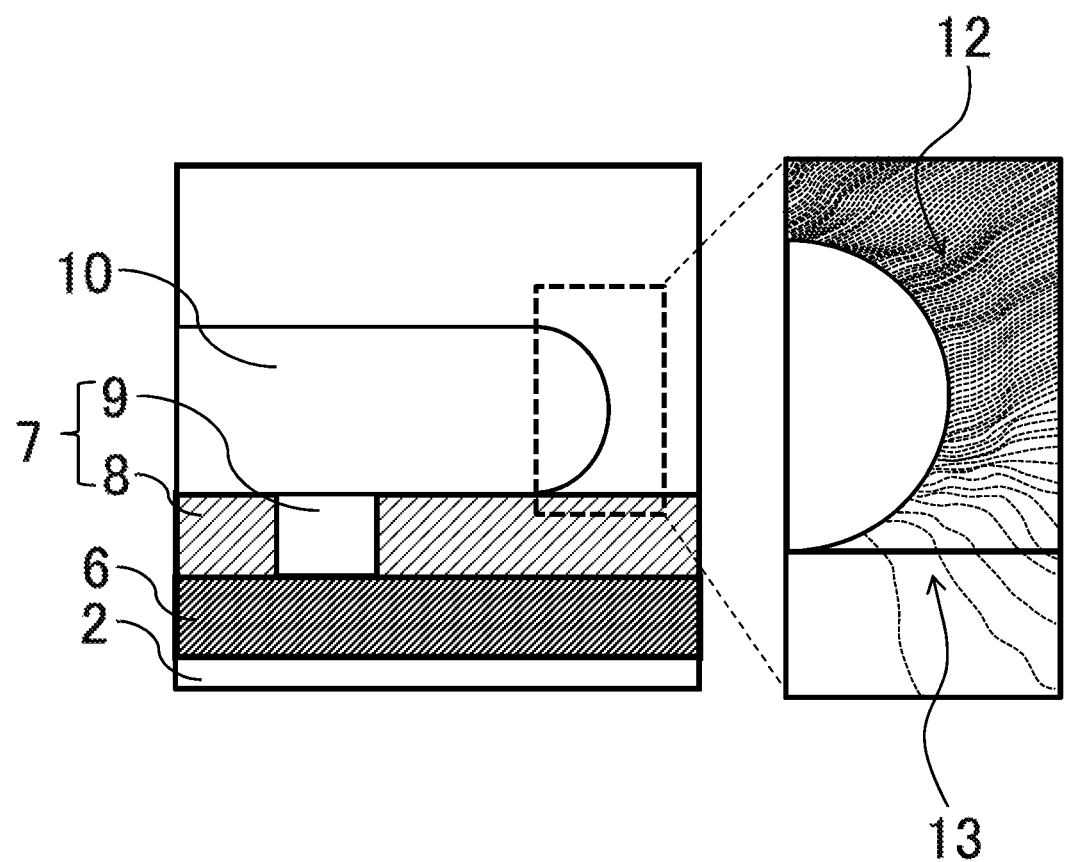
FIG. 9 is a distribution map of a surrounding electrical field when the metallic foreign substance disposed on top of a common low-resistance insulating film and the non-linear resistance insulating film obtains the electric field relaxation brought about by the non-linear resistance insulating film.

However, when the potential of the low-resistance insulating film 6 decreases to a ground potential in this state, the potential of the metallic foreign substance 10 also decreases to the ground potential, and so there is a possibility that when a high electric field is applied, the electric field around the metallic foreign substance 10 opposite to the central conductor 3 increases, and partial discharge occurs, causing the metallic foreign substance 10 to be electrically charged and float up. FIG. 9 is a distribution map of a surrounding electrical field when the metallic foreign substance disposed on a common low-resistance insulating film and the non-linear resistance insulating film obtains the electric field relaxation brought about by the non-linear resistance insulating film. The left side of FIG. 9 shows a structure of the metallic foreign substance disposed on the common low-resistance insulating film and the non-linear resistance insulating film, and the right side shows the condition of a surrounding electric field in the portion surrounded by the dotted line in the sectional view on the left side. FIG. 9 is shown including an electric field generated on the metallic foreign substance surface. In FIG. 9, numeral 12 shows an electric field: strong region, and numeral 13 an electric field: weak region. As shown in FIG. 9, the region around the metallic foreign substance 10 has the electric field: strong region 12, and there is a possibility that partial discharge occurs.

Also, there is a possibility that when the ground potential is reached, the metallic foreign substance 10 is electrically charged due to a conductive current from the grounded tank 2 and floats up. Consequently, the high-resistance insulating film 5 is formed on the inner surface of the grounded tank 2, and the low-resistance insulating film 6 and the non-linear resistance insulating film 7 are formed on top of the high-resistance insulating film 5, thereby causing the low-resistance insulating film 6 to have a floating potential.

Figure 10:
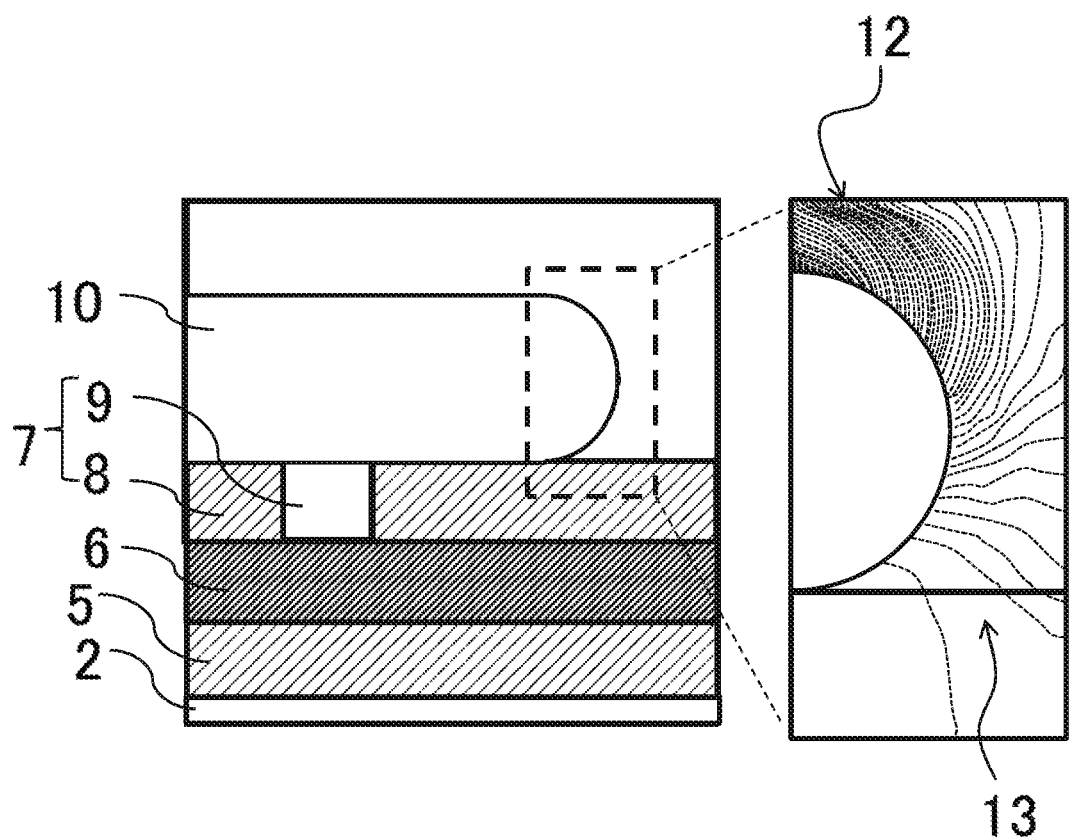
FIG. 10 is a distribution map of a surrounding electric field when the metallic foreign substance obtains the electric field relaxation brought about by the non-linear resistance insulating film, in the gas-insulated electrical equipment according to Embodiment 1 of the invention.

FIG. 10 is a distribution map of a surrounding electric field when the metallic foreign substance obtains the electric field relaxation brought about by the non-linear resistance insulating film, in the gas-insulated electrical equipment according to Embodiment 1 of the invention. The left side of FIG. 10 shows a structure of the metallic foreign substance 10 in contact with the non-linear resistance insulating film 7 configured on top of the low-resistance insulating film 6 in Embodiment 1, and the right side shows a condition of a surrounding electric field in the portion surrounded by the dotted line in the sectional view on the left side. FIG. 10 is shown including an electric field generated on the surface of the metallic foreign substance 10. In FIG. 10, numeral 12 is an electric field: strong region, and numeral 13 an electric field: weak region. As shown in FIG. 10, the electric field around the metallic foreign substance 10 opposite to the central conductor 3 can also be reduced to the degree that no partial discharge occurs, and thus it is possible to reduce the conductive current.

As above, the gas-insulated electrical equipment of Embodiment 1 is such that the low-resistance insulating film 6 is disposed on top of the high-resistance insulating film 5 disposed on the inner surface of the grounded tank 2, and the non-linear resistance insulating film 7 is disposed on top of the low-resistance insulating film 6, and so it is possible to relax a surrounding electric field other than in a portion of the metallic foreign substance 10 which is in direct contact with the non-linear resistance material 9 contained in the non-linear resistance insulating film 7, and thus possible to prevent partial discharge from occurring.

Embodiment 2

Figure 11:
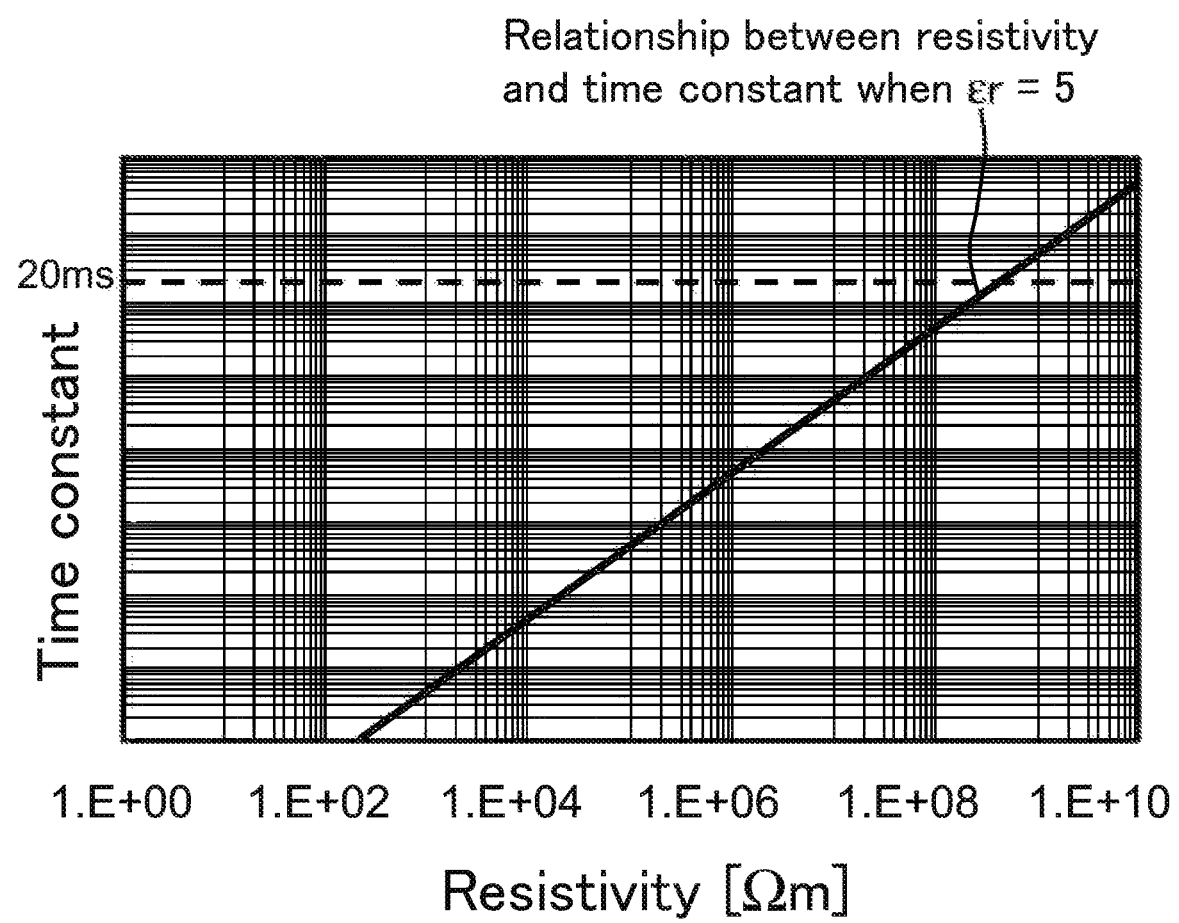
FIG. 11 is a graph representing the dependence of a time constant upon the electrical resistivity of a high-resistance insulating film having a relative permittivity of 5, in a gas-insulated electrical equipment according to Embodiment 2 of the invention.

Next, a detailed description will be given, based on FIG. 11, of a gas-insulated electrical equipment according to Embodiment 2 of the invention. In Embodiment 2, a description will be given of a high-resistance insulating film 5 such as to prevent the metallic foreign substance 10 from being electrically charged due to static induction.

As a factor which causes electric charge to flow into the metallic foreign substance 10 remaining stationary, there is a case in which the metallic foreign substance 10 is supplied with electric charge from the bottom surface or the like of the grounded tank 2 due to static induction, as previously described. The supply of electric charge from the bottom surface of the grounded tank 2 due to static induction can be prevented in the event that the high-resistance insulating film 5 exists between the metallic foreign substance 10 and the bottom surface of the grounded tank 2. Here, a time constant T of the high-resistance insulating film 5 is represented by the following expression (1).

$$T = \varepsilon r \times \varepsilon o \times \rho \tag{1}$$

where $\varepsilon r$ is the relative permittivity of the insulating film, $\varepsilon o$ is the permittivity of vacuum $8.85 \times 10^{-12}$ m$^{-3}$ kg$^{-1}$ s$^4$ A$^2$, and $\rho$ is the electrical resistivity of the insulating film.

Considering that an AC voltage of commercial frequency (50 or 60 Hz) is commonly applied to the central conductor 3, in order to suppress static induction caused by a change in the voltage, it is desirable that the time constant T of the high-resistance insulating film 5 is 20 ms or more in the case of, for example, the frequency of 50 Hz. A numerical example is such that when 20 ms for the time constant T of the high-resistance insulating film 5 and 5 for the relative permittivity $\varepsilon r$ are substituted into the expression (1), the electrical resistivity $\rho$ of the high-resistance insulating film 5 is $5.6 \times 10^8$ $\Omega$m, as shown in FIG. 11.

For example, when a voltage at which the inside of the grounded tank 2 has a high electric field is applied to the central conductor 3, it is desirable that the electrical resistivity of the high-resistance material of the high-resistance insulating film 5 is on the order of $10^9$ $\Omega$m or more. Also, by the high-resistance insulating film 5 existing, it is possible to guarantee the floating potential of the low-resistance insulating film 6.

By adopting a configuration such that the electrical resistivity $\rho$ of the high-resistance material of the high-resistance insulating film 5 is on the order of $10^9$ $\Omega$m or more, as heretofore mentioned, it is also possible to prevent electric charge from flowing into the metallic foreign substance 10 due to a leakage current from the grounded tank 2, and thus possible to prevent the metallic foreign substance 10 from being electrically charged due to static induction.

Embodiment 3

Next, a detailed description will be given of a gas-insulated electrical equipment according to Embodiment 3 of the invention. In Embodiment 3, a description will be given of the low-resistance insulating film 6 which can lower the potential of the metallic foreign substance 10 and relax the electric field around the metallic foreign substance 10, and of the non-linear resistance insulating film 7 which efficiently lowers the potential of the metallic foreign substance 10.

It has previously been described that when a high electric field is applied to the central conductor 3, the electrical resistivity of the non-linear resistance insulating film 7 decreases, thereby bringing about the effect of electric field relaxation of the metallic foreign substance 10, but for example, when the electrical resistivity of the low-resistance insulating film 6 has the same value as that of the non-linear resistance material 9 of the non-linear resistance insulating film 7, the potential of the metallic foreign substance 10 falls to the same potential as that of the low-resistance insulating film 6, and so it is possible to lower the electric field in the vicinity of the point of contact between the metallic foreign substance 10 and the non-linear resistance insulating film 7, and thus to prevent partial discharge from occurring. For example, when the respective electrical resistivities of both the non-linear resistance material 9 of the non-linear resistance insulating film 7 and the low-resistance insulating film 6 are $10 \times 10^3$ $\Omega$m, the potential of the metallic foreign substance 10 is ½ as compared with when no low-resistance insulating film 6 is configured.

By setting the electrical resistivity of the low-resistance insulating film 6 to be smaller than the lowest value of the electrical resistivity of the non-linear resistance material 9, as heretofore mentioned, it is possible to relax the electric field around the metallic foreign substance 10. Also, when the non-linear resistance material 9 disposed in the non-linear resistance insulating film 1 is disposed linked so as to connect the interface between the low-resistance insulating film 6 and the non-linear resistance insulating film 7 and the interface between the non-linear resistance insulating film 7 and the insulating gas, the metallic foreign substance 10 and the low-resistance insulating film 6 can be connected together via the shortest distance, and so it is possible to more effectively lower the potential of the metallic foreign substance 10.

Embodiment 4

Next, a detailed description will be given of a gas-insulated electrical equipment according to Embodiment 4 of the invention. In Embodiment 4, a description will be given of the electrical resistivity of the non-linear resistance insulating film 7 which can relax the electric field, before partial discharge occurs, even when a movement of the metallic foreign substance 10 due to mechanical vibration changes the local electric field in the portion of contact between the metallic foreign substance 10 and the non-linear resistance insulating film 7.

When mechanical vibration is applied to the grounded tank 2 from outside, there is a possibility that the metallic foreign substance 10 which has not had the amount of electric charge necessary for the metallic foreign substance 10 to float up when remaining stationary moves due to the vibration, and the local electric field in the vicinity of the point of contact between the metallic foreign substance 10 and the non-linear resistance insulating film 7 changes upon a movement of the metallic foreign substance 10, causing partial discharge to occur, and thus that electric charge is supplied to the metallic foreign substance 10, and the metallic foreign substance 10 floats up. The mechanical vibration applied to the grounded tank 2 from outside, which is stated here, is, for example, an earthquake, or vibration generated by a movement of, for example, a device (a disconnector or a breaker) installed together with the grounded tank 2. In order for partial discharge not to occur at the instant the metallic foreign substance 10 moves, it is necessary for the local electric field in the vicinity of the point of contact between the metallic foreign substance 10 and the non-linear resistance insulating film 7 to return to substantially the same value as a local electric field value, at which the metallic foreign substance 10 is stationary, before partial discharge occurs. This time needed for the electric field to return to its original value is defined as the time constant.

Here, the respective time constants T of the high-resistance insulating film 5, low-resistance insulating film 6, and non-linear resistance insulating film 7 are each represented by the previously described expression (1). On the other hand, a time called a discharge delay time exists until partial discharge occurs in the metallic foreign substance 10. The discharge delay time is the sum of a statistical delay time, after a voltage is applied until an initial electron which is a source of discharge is generated, and a formation delay time after an initial electron is generated until the initial electron grows into discharge. The statistical delay time of discharge in gas is a minimum of approximately zero s, and the formation delay time is a minimum of several tens of ns. Because of this, a minimum of discharge delay time is taken to be several tens of ns (for example. Literature "Clarification of Shortest Time Region V-t Characteristics of Quasi-uniform Field Gap in SF6 produced by Square Impulse (written by Central Research Institute of Electric Power Industry)").

Consequently, the time constant T of the non-linear resistance insulating film 7 is set to be smaller than the discharge delay time, and thereby it is possible to relax the electric field in the vicinity of the point of contact between the metallic foreign substance 10 and the Bon-linear resistance insulating film 7 before partial discharge occurs in the vicinity of the point of constant therebetween, and thus possible to prevent the metallic foreign substance 10 from being electrically charged.

Incidentally, a numerical, example is such that when 50 ns for discharge delay time=time constant (a time constant at the minimum value of electrical resistivity) and 10 for the relative permittivity of the non-linear resistance insulating film 7 are substituted into the expression (1), the electrical resistivity of the non-linear resistance insulating film 7 is $5.5 \times 10^2$ Ωm.

By configuring the electrical resistivity of the non-linear resistance insulating film 7 so that the time constant T of the non-linear resistance insulating film 7 is smaller than the discharge delay time, as heretofore mentioned, the electric field value in the vicinity of the portion of contact between the metallic foreign substance 10 and the non-linear resistance insulating film 7 can be returned to the local electric field value when the metallic foreign substance 10 remains stationary, before partial discharge occurs in the vicinity of the portion of contact therebetween, even when a displacement of the metallic foreign substance 10 occurs due to vibration of the grounded tank 2, and thus it is possible to prevent partial discharge from occurring.

Embodiment 5

Next, a detailed description will be given of a gas-insulated electrical equipment according to Embodiment 5 of the invention. In Embodiment 5, a description will be given, as the low-resistance insulating film 6, of one that is configured of a resin coating film of low electrical resistivity.

As a resin of low electrical resistivity, a conductive polymer is used. The conductive polymer includes, for example, polyacetylene, polyparaphenylene, polythiophene, polypyrrole, polyaniline, and polyacene. As the conductive polymer can be coated as a resin itself, it is easier to form a film thereof than when utilizing a powder of a low-resistance material.

By configuring the low-resistance insulating film 6 of a resin coating film of low electrical resistivity, as heretofore mentioned, it is possible to suppress the electric field in the vicinity of the metallic foreign substance 10, and thus possible to prevent partial discharge from occurring when the metallic foreign substance 10 remains stationary or also when the metallic foreign substance 10 moves due to vibration.

As above, a description has been giver, of the embodiments of the invention, but the invention, not being limited to the embodiments, is such that various design changes can be made, and that the individual embodiments can be freely combined, and any of the embodiments can be appropriately modified or omitted, within the scope of the invention.

INDUSTRIAL APPLICABILITY

The gas-insulated electrical equipment of the invention is useful as a gas-insulated switchgear used by being combined with a device, such as a breaker, a disconnector, or an instrument current transformer.

REFERENCE SIGNS LIST

1: Gas-insulated electrical equipment, 2: Grounded tank, 3: Central conductor, 4: Insulating support member, 5: High-resistance insulating film (high-resistance insulating portion), 6: Low-resistance insulating film (low-resistance insulating portion), 7: Non-linear resistance insulating film (non-linear resistance insulating portion), 8: Insulating material, 9: Non-linear resistance material, 10: Metallic foreign substance, 11: Minute gap

The invention claimed is:

1. A gas-insulated electrical equipment, comprising:
   a grounded tank filled with an insulating gas;
   a central conductor which is disposed inside the grounded tank and to which to apply a voltage;
   a high-resistance insulating portion which is disposed on an inner surface of the grounded tank and which is configured of an insulating material of high resistivity;
   a low-resistance insulating portion which is disposed on at least a partial front surface of the high-resistance insulating portion and which has a resistivity lower than that of the high-resistance insulating portion; and
   a non-linear resistance insulating portion which is disposed on at least a partial front surface of the low-resistance insulating portion and which is configured of a non-linear resistance material, which exhibits a non-linear resistivity relative to a change in electric field, and an insulating material of high resistivity, wherein
   the low-resistance insulating portion has a floating potential, wherein
   the electrical resistivity of the low-resistance insulating portion is smaller than the lowest value of the electrical resistivity of the non-linear resistance material of the non-linear resistance insulating portion.

2. The gas-insulated electrical equipment according to claim 1, wherein
   the high-resistance insulating portion has an electrical resistivity of $10^9$ Ωm or more.

3. The gas-insulated electrical equipment according to claim 1, wherein
   the non-linear resistance insulating portion is such that the non-linear resistance material is disposed therein in such a state as to be linked so as to connect the interface between the low-resistance insulating portion and the non-linear resistance insulating portion and the interface between the non-linear resistance insulating portion and the insulating gas.

4. The gas-insulated electrical equipment according to claim 1, wherein
   a time constant of the non-linear resistance insulating portion is smaller than a discharge delay time.

5. The gas-insulated electrical equipment according to claim 1, wherein
   the low-resistance insulating portion is configured of a low-resistivity material of conductive polymer.

* * * * *